UNITED STATES PATENT OFFICE.

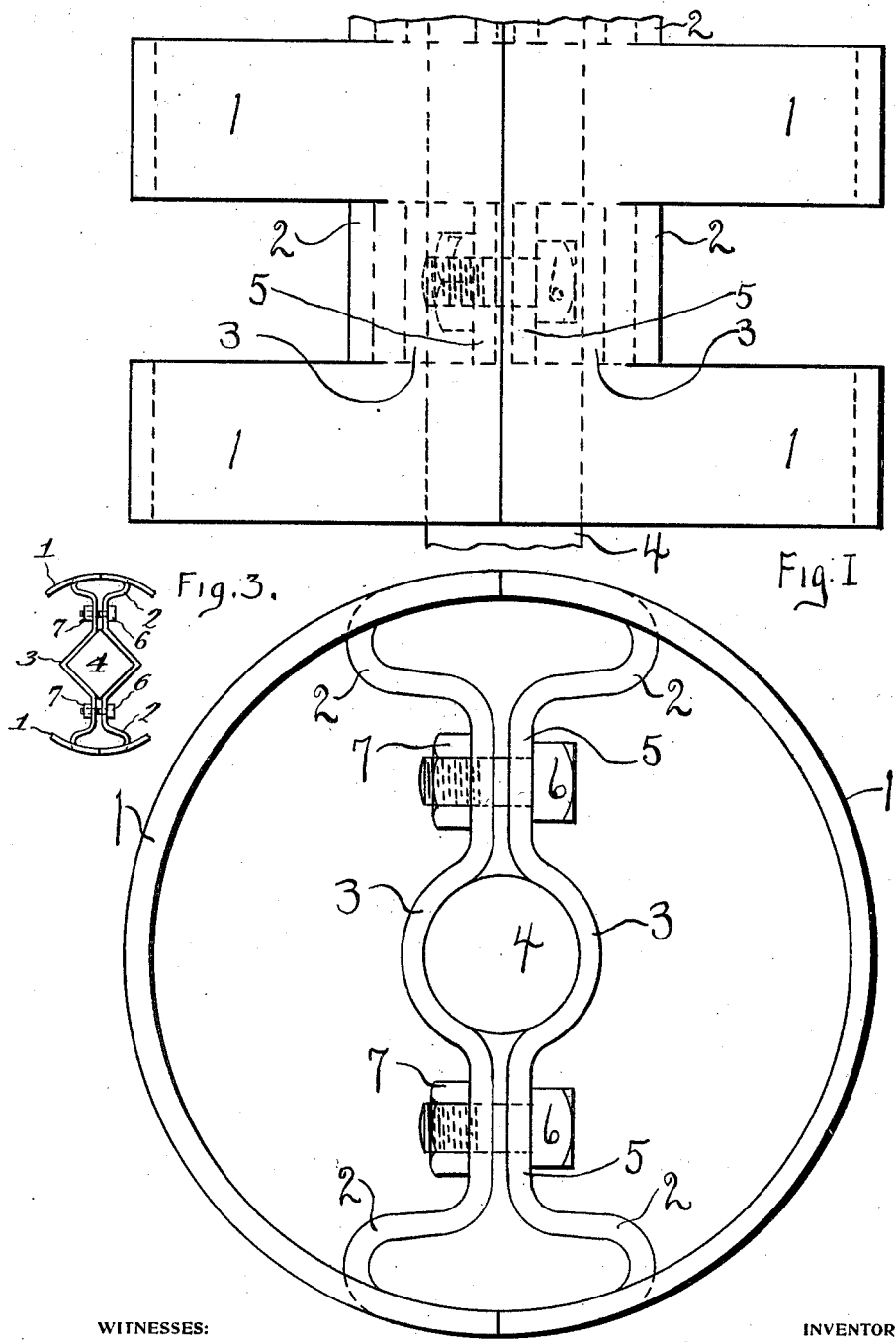

RAYMOND W. DULL, OF AURORA, ILLINOIS.

PULLEY.

1,029,535.
Specification of Letters Patent.
Patented June 11, 1912.

Application filed October 21, 1910. Serial No. 588,351.

*To all whom it may concern:*

Be it known that I, RAYMOND W. DULL, a citizen of the United States, residing at 395 Garfield avenue, Aurora, in the county of Kane and State of Illinois, have invented a new and useful Improvement in Pulleys, of which the following is a specification.

My invention relates to improvements in pullleys of the type known as the split pulley, in which the pulley is built up of two similarly made parts fastened together on the shaft, and has for its object the production of such a pulley in which each of the parts or halves is made from a single piece or sheet of metal, and in which the arm and the portion which fits on the shaft is partially separated and formed from the rim portion, the making of which requires merely the use of forging dies. Its further object is to produce a split pulley which is very simple and inexpensive to manufacture and one which is very durable and which can be very readily and rigidly secured on the shaft. I attain these objects by the construction illustrated in the accompanying drawings, in which—

Figure 1 is a top plan view of my pulley. Fig. 2 is a side view of the pulley. Fig. 3 is a side view of a modification for a square shaft showing only a portion of the pulley.

Similar numerals refer to similar parts throughout the several views.

In the drawings 1 represents the rim portion of each half of my pulley. From this rim portion an arm portion comprising the parts 2, part 3 and parts 5, is partially cut and formed as shown in Fig. 2. The part 3 is formed concentric with the rim 1 and is the part which fits the shaft 4 on which the pulley is mounted. For square shafts this could be angular. (See Fig. 3.) Adjacent to this part 3, on each side thereof, is a straight portion 5 having an aperture through which a bolt 6, having a nut 7, passes and unites the two halves of the pulley as shown in Fig. 2 of the drawing. The parts 2 can be made of any convenient shape, the shape shown in the Fig. 2 being one which adapts itself readily to the shaping or bending processes necessary and which I have found practicable.

In making my split pulleys each half is formed with the same die, each half being the same and formed from a single piece or sheet of metal, although it is evident that I can use a pipe or tube to form up such a pulley as the arm portion can be formed from the rim the same as from the sheet of metal, and the rim then sawed to separate the pulley into the two halves, or can be left solid as desired.

From the above description of my split pulley it is seen that it is particularly well adapted for very wide belts, such as are used for belt conveyers, as any number of arm portions can be cut or sheared from the rim and formed as shown. It can also be used with only one rim and one arm portion for taking care of any narrow belt. It is seen that my pulley can be readily attached to the shaft as the nuts 7 and the bolts 6 are exposed and accessible, there being no rim portion to interfere at this point. Any of the usual fastenings can be applied at the rim to further secure the alinement of the halves of the pulleys, if desired, but I do not find that any fastening at the rim is necessary.

It will be understood, of course, that while I have here shown one form of my pulley, I do not wish to limit myself to the exact form or shape of the parts shown, but desire to have it taken in a sense diagrammatic of any or all the forms of the same which come within the scope of my claims.

I claim:

1. A pulley having two similarly formed members, each member comprising separated rim portions and an intermediate arm integral with said rim portions, said arm having a suitably shaped portion adapted for securing the members to a suitably shaped shaft.

2. A pulley having a plurality of similarly formed members, each member comprising separated rim portions and intermediate arms integral with said rim portions, said arms having a suitably shaped portion adapted for securing the members to a suitably shaped shaft.

3. In a pulley a member comprising separated rim portions and intermediate arms integral with said rim portions, said arms having a suitably shaped portion adapted for securing said member to a suitably shaped shaft.

RAYMOND W. DULL.

Witnesses:
C. N. JANES,
HARRY SMALL.

Copies of this patent may be obtained for five cents each, by addressing the "Commissioner of Patents, Washington, D. C."